US008922879B2

(12) United States Patent
Tamura

(10) Patent No.: US 8,922,879 B2
(45) Date of Patent: Dec. 30, 2014

(54) OPTICAL AMPLIFYING DEVICE AND OPTICAL AMPLIFYING METHOD

(75) Inventor: Yuji Tamura, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 226 days.

(21) Appl. No.: 13/336,130

(22) Filed: Dec. 23, 2011

(65) Prior Publication Data

US 2012/0236396 A1    Sep. 20, 2012

(30) Foreign Application Priority Data

Mar. 16, 2011 (JP) ................................. 2011-057816

(51) Int. Cl.
*H01S 3/131* (2006.01)
*H01S 3/094* (2006.01)
*H04B 10/296* (2013.01)
*H01S 3/067* (2006.01)
*H01S 3/0941* (2006.01)

(52) U.S. Cl.
CPC ........... *H01S 3/1312* (2013.01); *H01S 3/06754* (2013.01); *H04B 10/296* (2013.01); *H01S 3/09415* (2013.01); *H01S 3/094069* (2013.01)
USPC .................................................. 359/341.43

(58) Field of Classification Search
CPC ... H01S 3/1301; H01S 3/1305; H01S 3/1306; H01S 3/0912
USPC .................................................... 359/341.43
See application file for complete search history.

(56) References Cited

U.S. PATENT DOCUMENTS

| | | | |
|---|---|---|---|
| 5,267,071 A * | 11/1993 | Little et al. ..................... 398/162 |
| 5,268,786 A * | 12/1993 | Matsushita et al. ......... 359/341.33 |
| 5,572,356 A | 11/1996 | Yoshida et al. |
| 5,633,750 A * | 5/1997 | Nogiwa et al. ............ 359/341.41 |
| 5,680,246 A * | 10/1997 | Takahashi et al. ........ 359/341.43 |
| 5,701,195 A * | 12/1997 | Chikama ................... 359/341.43 |
| 5,986,799 A * | 11/1999 | Itou et al. ........................ 359/337 |
| 6,166,850 A * | 12/2000 | Roberts et al. .............. 359/341.2 |
| 6,342,959 B1 * | 1/2002 | Haxell et al. ..................... 398/79 |
| 6,356,386 B1 * | 3/2002 | Denkin et al. ................ 359/337 |
| 6,396,625 B1 * | 5/2002 | Nakaji ....................... 359/341.41 |
| 6,407,854 B1 * | 6/2002 | Shum ........................ 359/341.41 |

(Continued)

FOREIGN PATENT DOCUMENTS

| | | |
|---|---|---|
| JP | 8-032162 A | 2/1996 |
| JP | 8-204267 A | 8/1996 |
| JP | 11-026848 A | 1/1999 |
| JP | 2000-151515 A | 5/2000 |
| JP | 2003-051632 A | 2/2003 |
| JP | 2005-192256 A | 7/2005 |

OTHER PUBLICATIONS

Numai, Takahiro "Basics of Semiconductor Laser Technology", Jul. 30, 1996, pp. 118-131 and pp. 152-163, Partial English Translation.

*Primary Examiner* — Ari M Diacou
(74) *Attorney, Agent, or Firm* — Fujitsu Patent Center

(57) ABSTRACT

An optical amplifying device includes a semiconductor laser that outputs a pump light having a power according to a provided drive current; a rare-earth-doped amplifying medium that amplifies an input light by the pump light output from the semiconductor laser; and a detector that detects, in the power of the pump light, a fluctuation faster than a response speed of a gain of the amplifying medium with respect to the power of the pump light. The optical amplifying device varies the drive current provided to the semiconductor laser based on the fluctuation detected by the detector.

12 Claims, 18 Drawing Sheets

(56) References Cited

U.S. PATENT DOCUMENTS

| | | | |
|---|---|---|---|
| 6,433,925 B1 * | 8/2002 | Sakano et al. | 359/341.43 |
| 6,476,961 B1 * | 11/2002 | Ye et al. | 359/341.43 |
| 6,661,570 B2 * | 12/2003 | Nakaji | 359/341.41 |
| 7,038,769 B2 * | 5/2006 | Komaki | 356/73.1 |
| 8,094,369 B2 * | 1/2012 | Zhuber-Okrog | 359/337.1 |
| 8,339,698 B2 * | 12/2012 | Hiraizumi et al. | 359/334 |
| 2006/0215716 A1 * | 9/2006 | Luo et al. | 372/38.08 |
| 2010/0157415 A1 * | 6/2010 | Okrog | 359/333 |
| 2012/0050845 A1 * | 3/2012 | Lange | 359/341.41 |

* cited by examiner

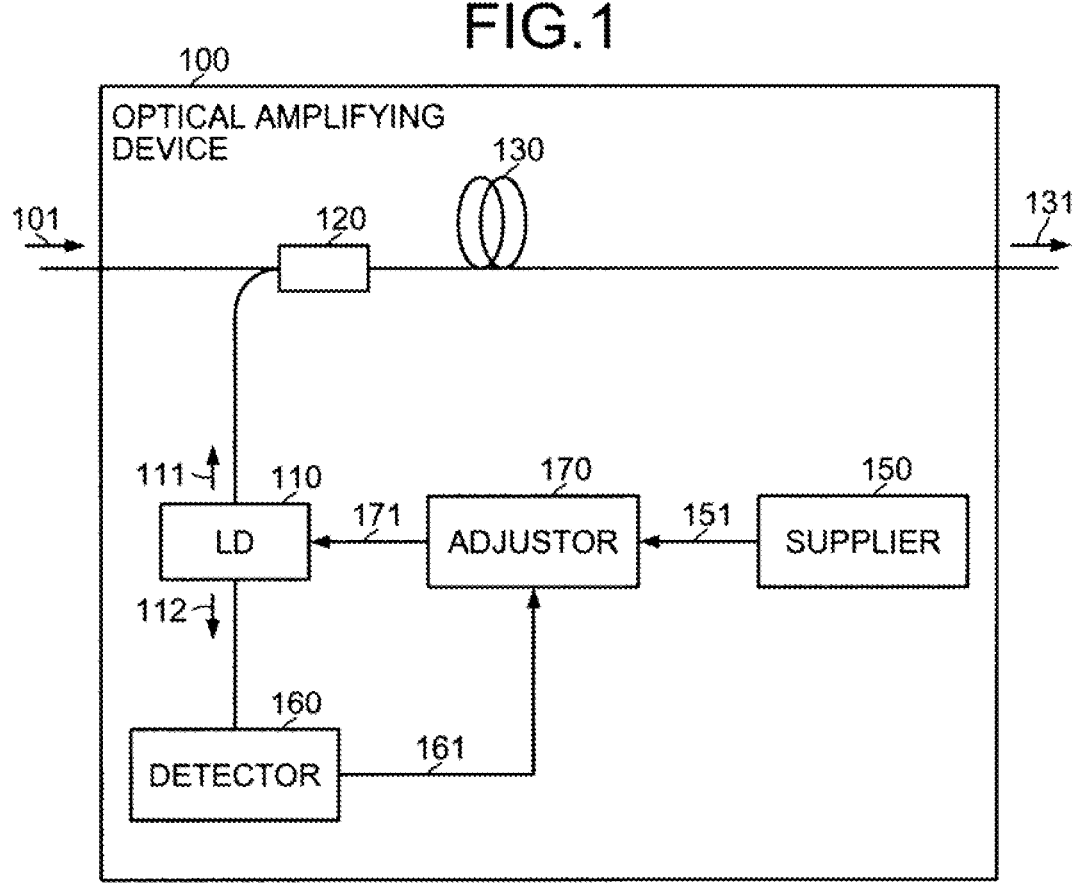

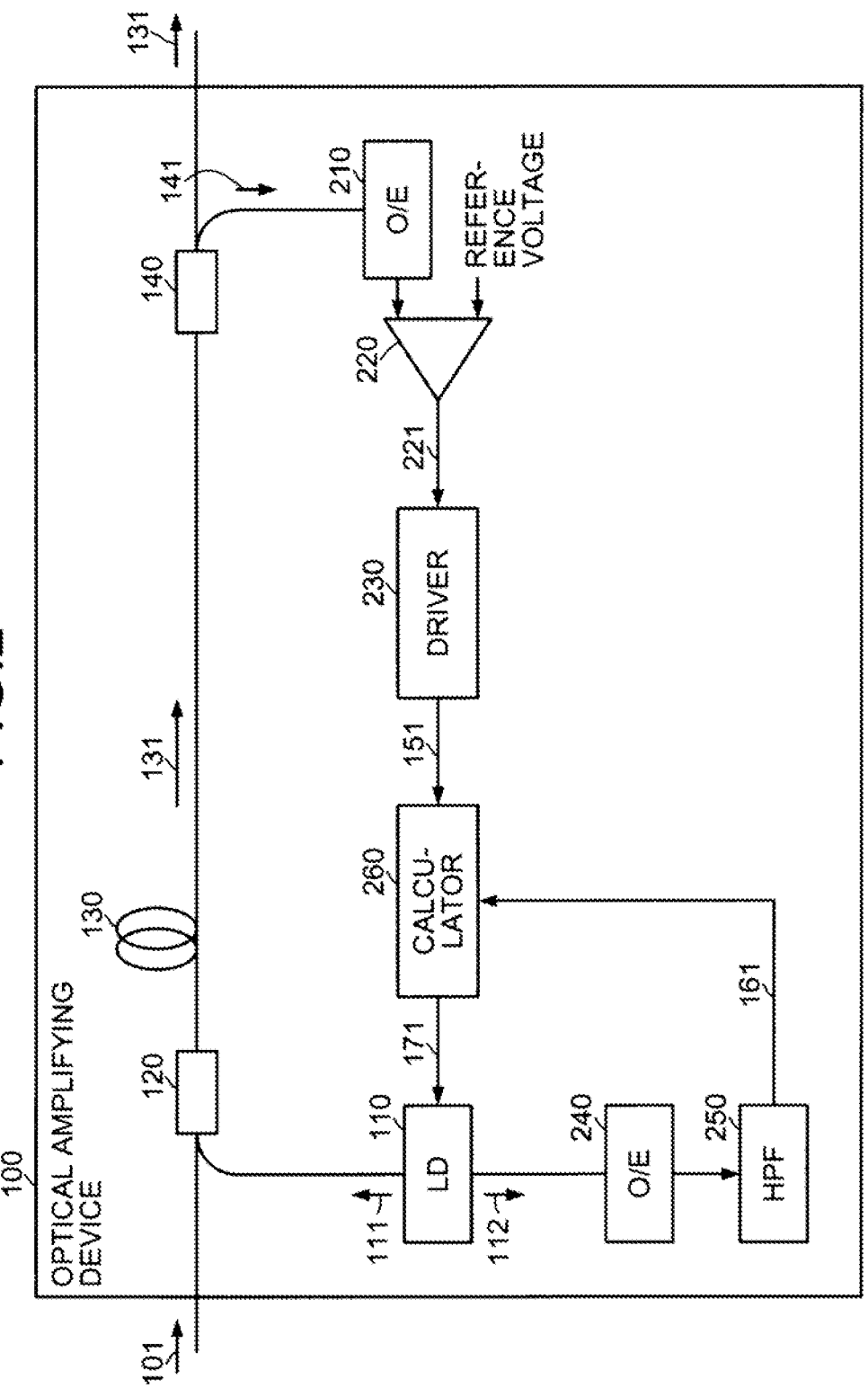

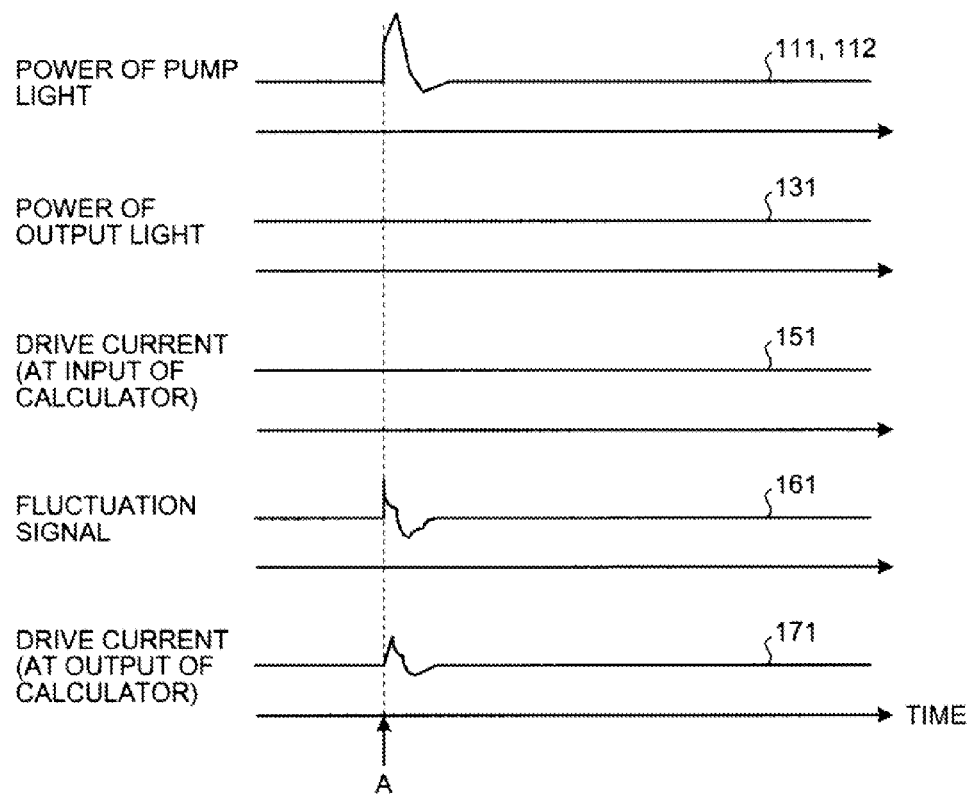

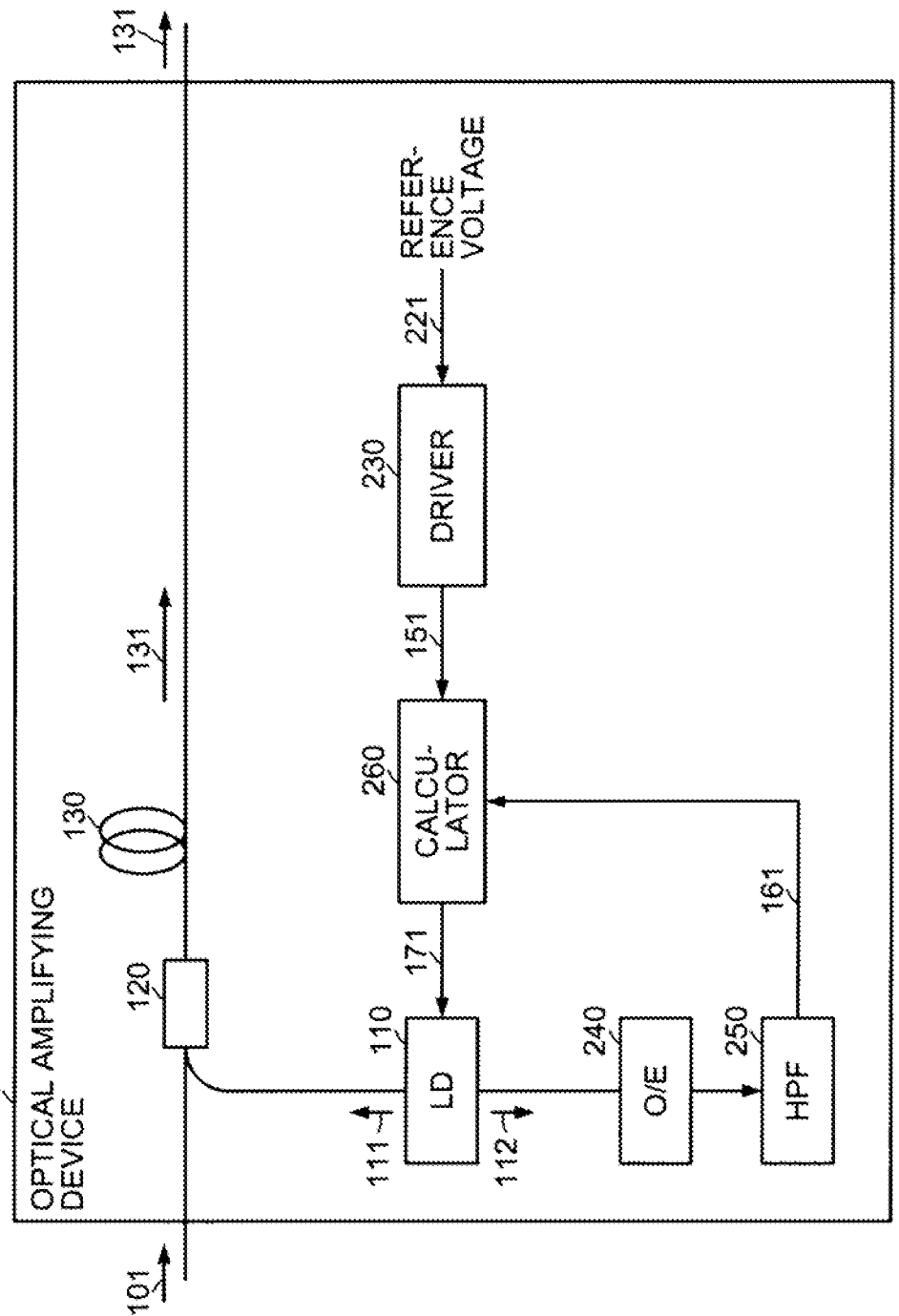

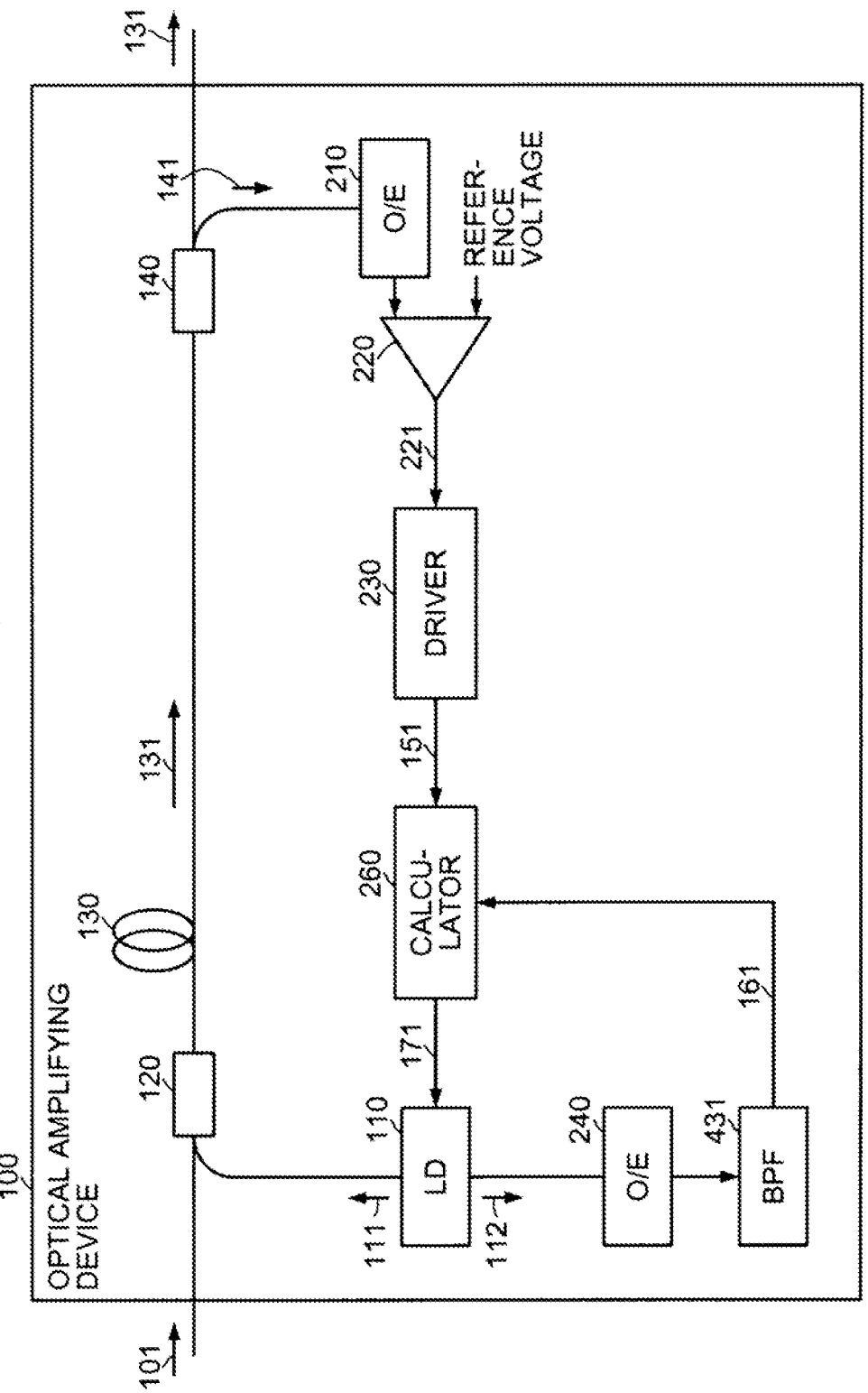

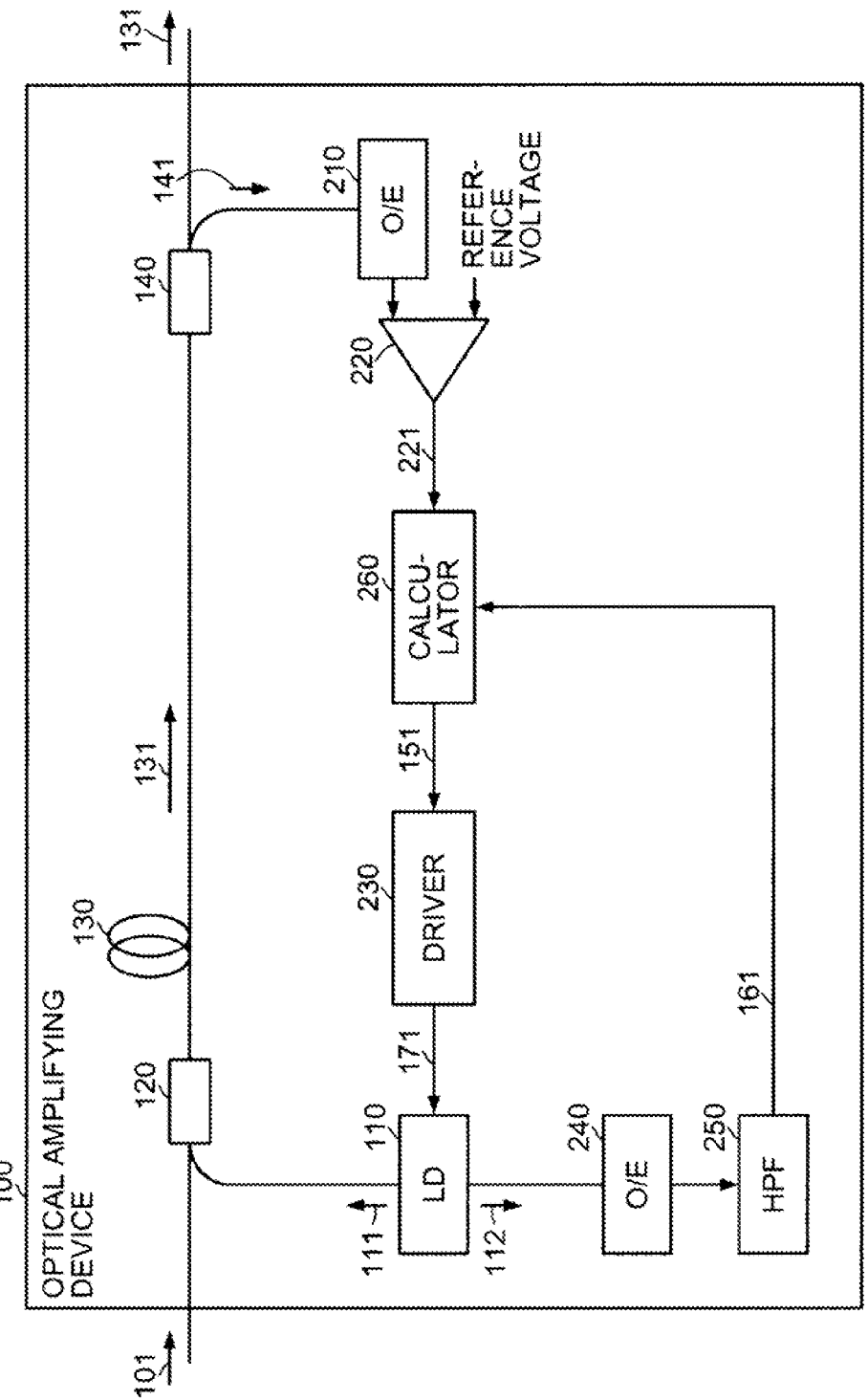

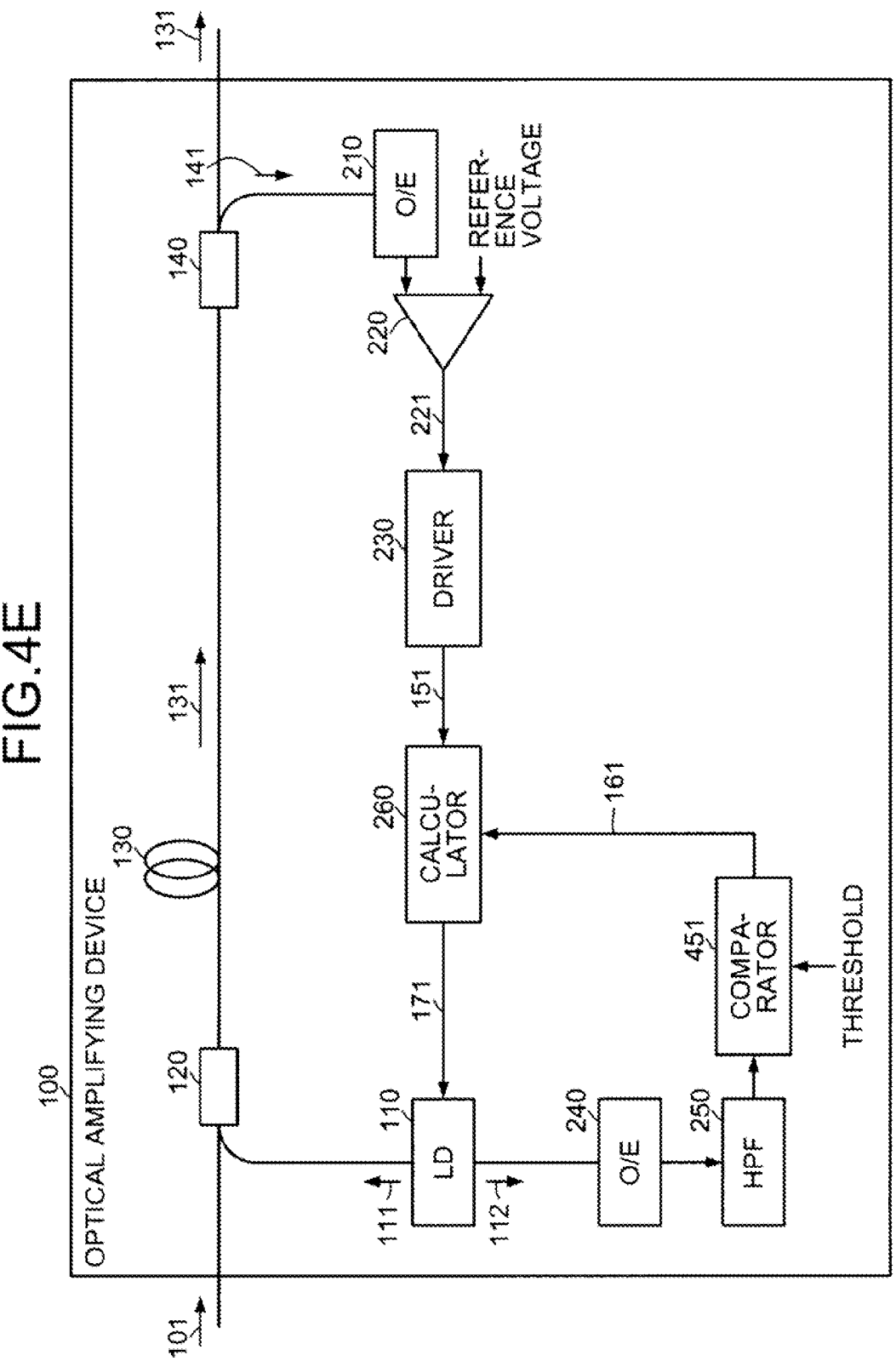

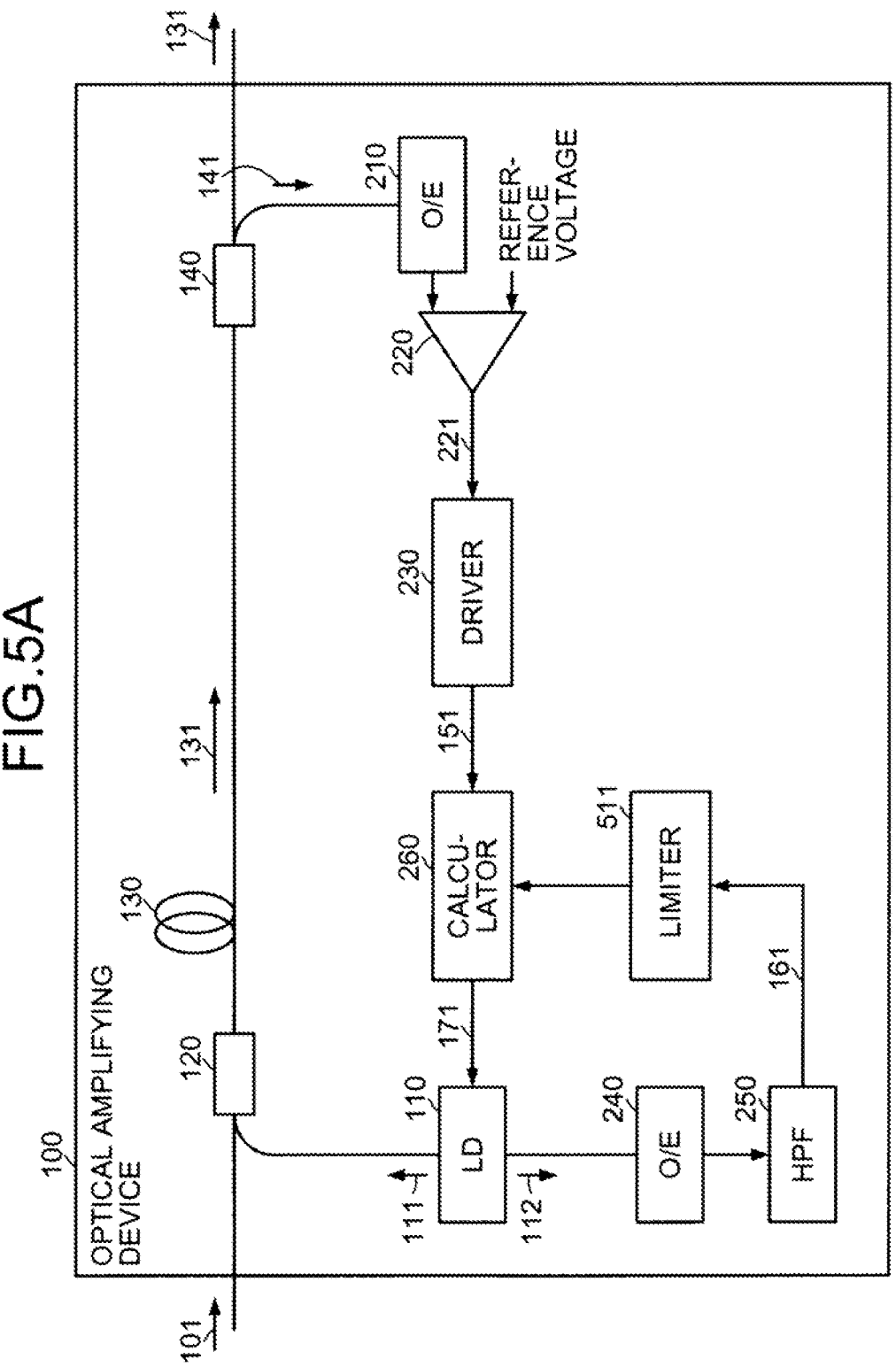

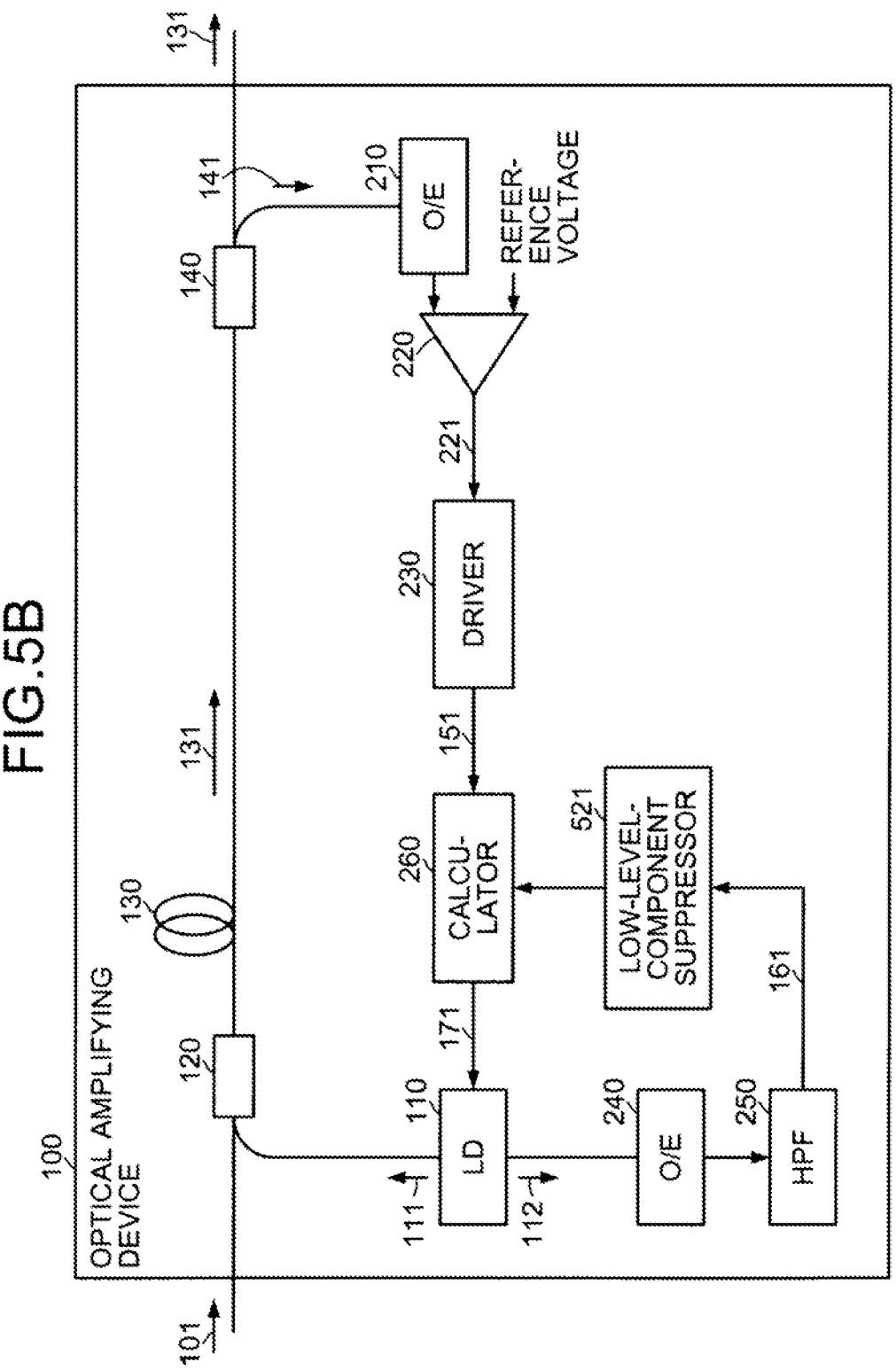

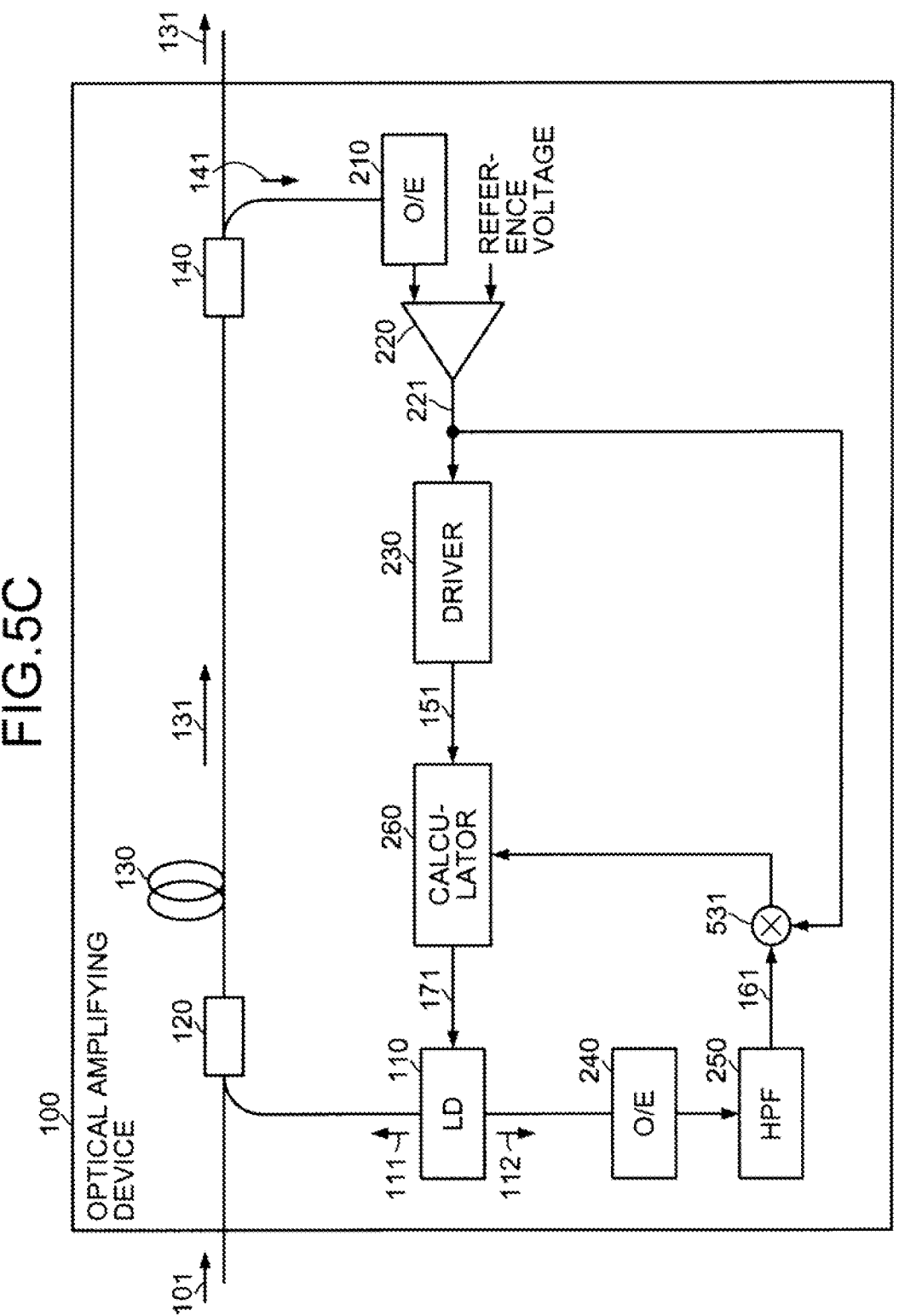

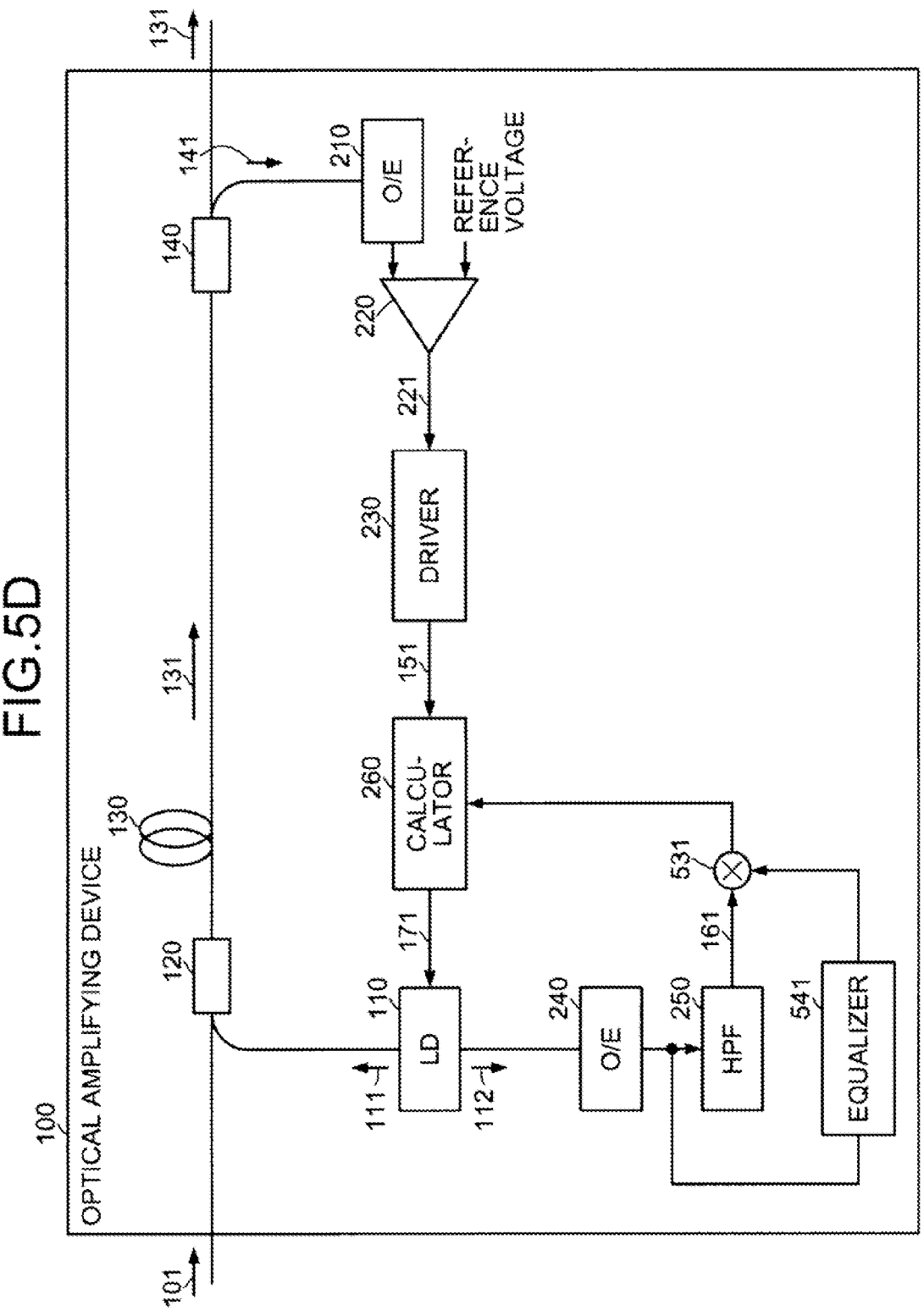

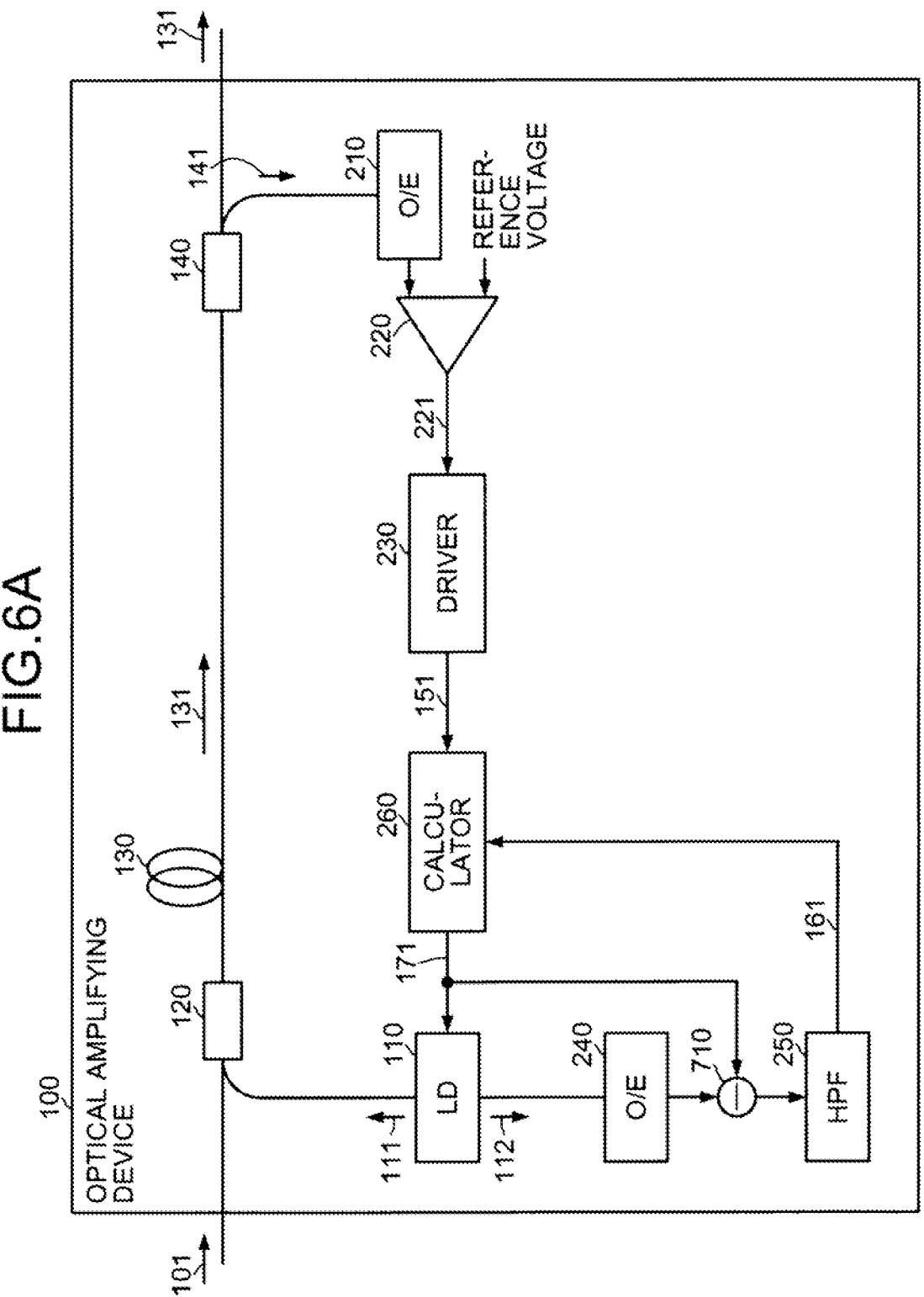

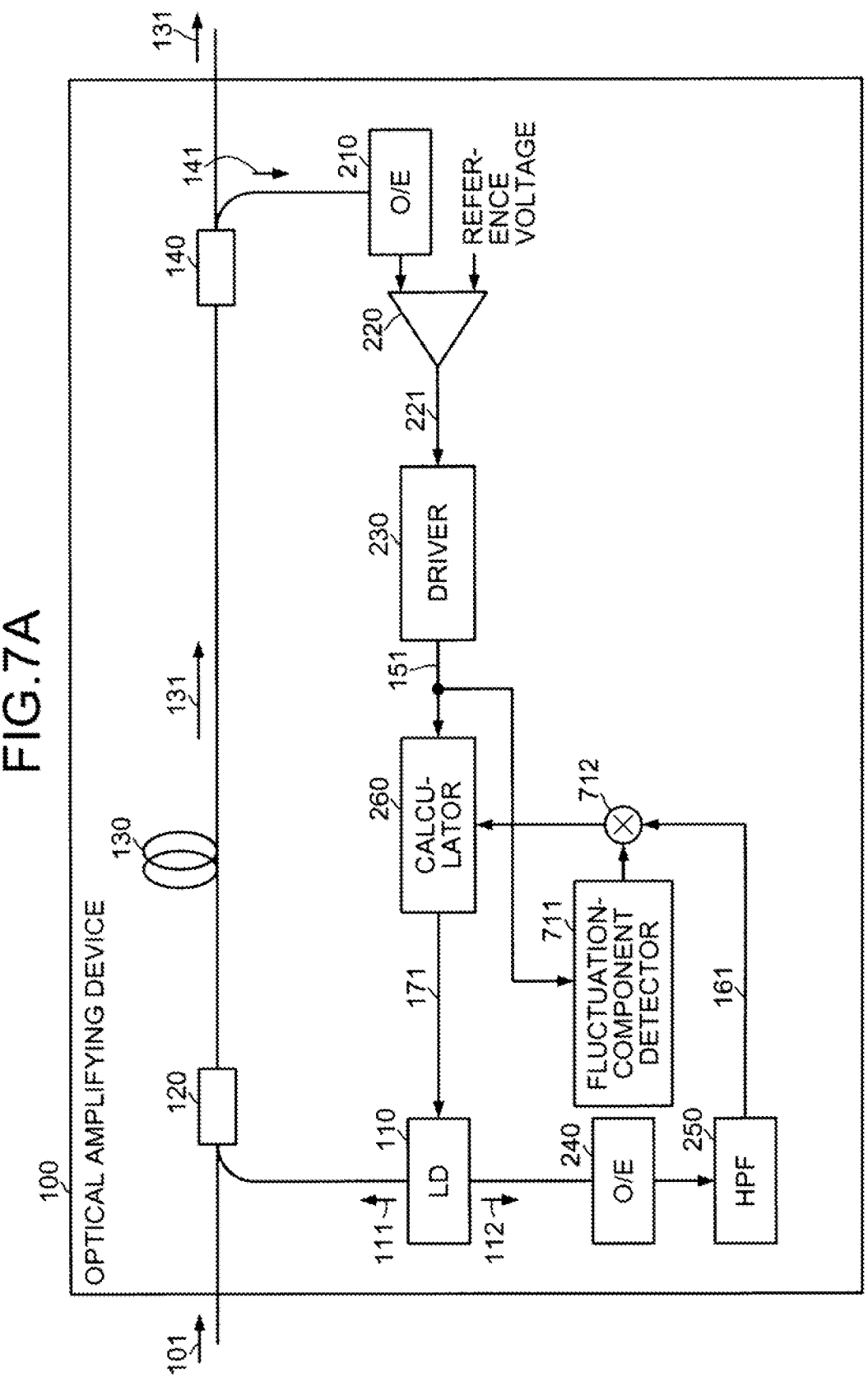

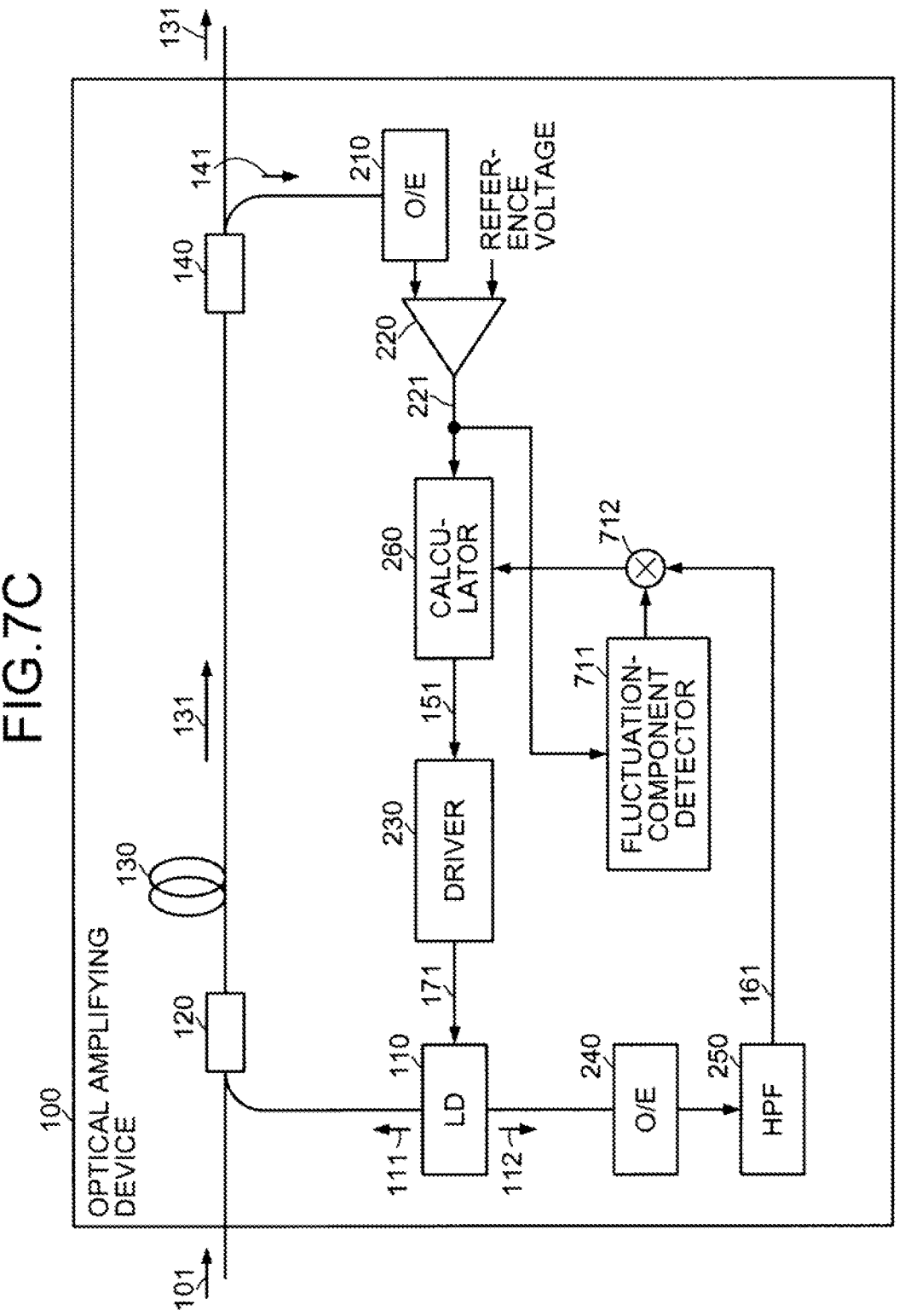

OPTICAL AMPLIFYING DEVICE AND OPTICAL AMPLIFYING METHOD

CROSS REFERENCE TO RELATED APPLICATIONS

This application is based upon and claims the benefit of priority of the prior Japanese Patent Application No. 2011-057816, filed on Mar. 16, 2011, the entire contents of which are incorporated herein by reference.

FIELD

The embodiments discussed herein are related to an optical amplifying device and an optical amplifying method for amplifying light.

BACKGROUND

An optical amplifier using an erbium (Er) doped fiber (EDF) is known as an optical amplifier using a rare-earth-doped amplifying medium. The EDF amplifies an input light with a gain according to the level of a pump light of 0.98 μm band to 1.48 μm band. A laser diode (LD) (semiconductor laser) is used as a pump source.

The LD oscillates to emit a light by a cavity structure. Recently, the oscillation wavelength of an LD is set by an external cavity structure in which an external reflector that reflects only a given wavelength is connected to an output fiber of the LD. The wavelength and the intensity of the light output from the LD are determined mainly based on the gain due to an externally-provided current and the cavity length.

The output power of the LD may become unstable if the oscillation mode of the LD fluctuates due to external reflection and/or polarization state, particularly when the driving power of the LD is low. The cycle of the fluctuation when the LD is unstable is highly dependent on the external environment, and thus indefinite. The optical amplifier using the EDF performs feedback control of the LD of the pump source based on a monitored value of the output from the optical amplifier. It is also known to superimpose a high frequency to improve the instability of the LD (see, for example, Japanese Laid-Open Patent Publication Nos. H8-32162 and H8-204267).

However, in the conventional technologies described above, the feedback control of the LD based on the value output from the amplifying medium cannot be on time if the output power of the LD fluctuates faster than the response speed of the amplifying medium, and the power of the light output from the amplifying medium disadvantageously fluctuates and cannot be stabilized. Further, the superimposed high-frequency component accumulates and affects the transmission quality, particularly when multiple optical amplifiers are connected.

SUMMARY

According to an aspect of an embodiment, an optical amplifying device includes a semiconductor laser that outputs a pump light having a power according to a provided drive current; a rare-earth-doped amplifying medium that amplifies an input light by the pump light output from the semiconductor laser; and a detector that detects, in the power of the pump light, a fluctuation faster than a response speed of a gain of the amplifying medium with respect to the power of the pump light. The optical amplifying device varies the drive current provided to the semiconductor laser based on the fluctuation detected by the detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram of an example of an optical amplifying device according to a first embodiment.

FIG. 2 is a diagram of a configuration example of the optical amplifying device depicted in FIG. 1.

FIGS. 3B and 3C are diagrams of an example of operation of each component when the drive current is varied (subtracted and added, respectively).

FIGS. 4A, 4B, 4C, 4D, 4E and 5A, 5B, 5C, 5D are diagrams of a first to a ninth modifications of the optical amplifying device depicted in FIG. 2, respectively.

FIG. 6A is a diagram of a configuration example of an optical amplifying device according to a second embodiment.

FIG. 7A is a diagram of a configuration example of an optical amplifying device according to a third embodiment.

FIG. 7C is a diagram of a modification of the optical amplifying device depicted in FIG. 7A.

DESCRIPTION OF EMBODIMENTS

Figure 3A:
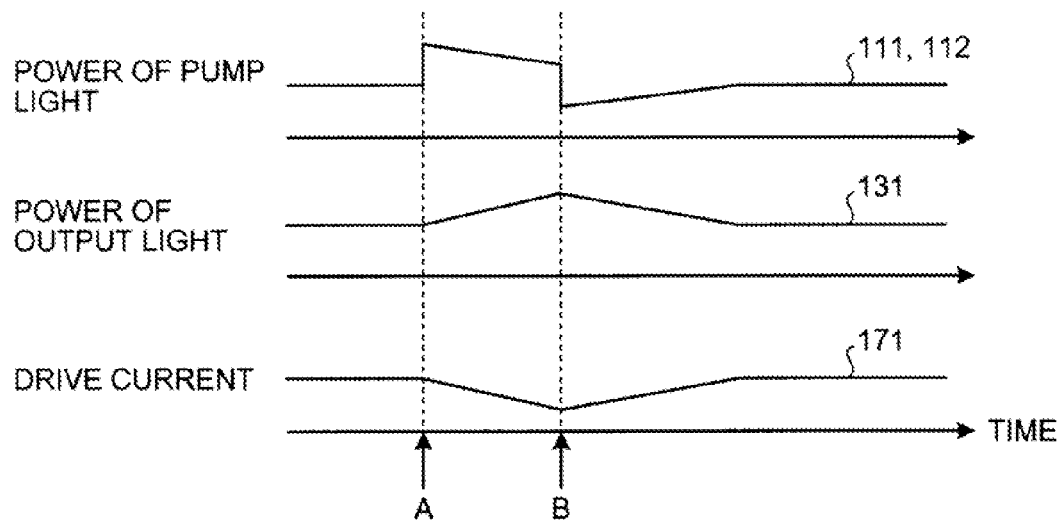
FIG. 3A is a diagram of a comparison example of operation of each component if a drive current is not varied.

Preferred embodiments of the present invention will be explained with reference to the accompanying drawings.

FIG. 1 is a diagram of an example of an optical amplifying device according to a first embodiment. An optical amplifying device 100 depicted in FIG. 1 is an optical amplifying device that amplifies and outputs an input light 101, and includes an LD 110, a combiner 120, an amplifying medium 130, a supplier 150, a detector 160, and a adjustor 170.

The LD 110 is a semiconductor laser that outputs pump lights 111 and 112 to the combiner 120 and the detector 160, respectively. The pump lights 111 and 112 have the power according to a provided drive current 171. For example, the pump lights 111 and 112 may be lights branched by a branching coupler from a light output from the LD 110, or a forward pump light 111 and a backward pump light 111.

The light 101 input to the optical amplifying device 100 and the pump light 111 output from the LD 110 are input to the combiner 120 that combines and outputs the input light 101 and the pump light 111 to the amplifying medium 130.

The amplifying medium 130 is a rare-earth-doped amplifying medium such as an EDF that is an optical fiber having a core to which erbium ion is doped. The input light 101 and the pump light 111 combined by and output from the combiner 120 is input to the amplifying medium 130 that amplifies the input light 101 according to the power of the pump light 111. The response speed (response frequency) of the gain of the amplifying medium 130 with respect to a change in the power of the pump light 111 is, for example, about several hundreds (Hz) to several tens (kHz). The amplifying medium 130 outputs the amplified input light 101 as an output light 131.

The supplier 150 outputs a drive current 151 to be provided to the LD 110. The drive current 151 may be controlled based on the power of the output light 131, or be a constant current. The drive current 151 output from the supplier 150 is input to the adjustor 170.

The detector 160 detects, in the power of the pump light 112 output from the LD 110, a fluctuation faster than the response speed of the amplifying medium 130. For example, the detector 160 detects a fluctuation component (differential component) having a frequency higher than the response speed. Alternatively, the detector 160 may detect the presence/absence of a fluctuation in the power of the pump light 112 having a frequency higher than the response speed. The detector 160 outputs a fluctuation signal 161 indicating the result of the detection to the adjustor 170.

The adjustor 170 provides the drive current 151 output from the supplier 150 to the LD 110 as the drive current 171. The adjustor 170 varies the drive current 171 provided to the LD 110 based on the fluctuation signal 161 output from the detector 160, when the fluctuation faster than the response speed is detected.

For example, the adjustor 170 steeply changes the drive current 171 such that the LD 110 is brought into a multimode-oscillation state in which the LD 110 oscillates in multiple modes. The adjustor 170 varies (for example, increases, decreases, or alternately increases and decreases) the drive current 171 at a frequency higher than the response speed of the amplifying medium 130.

When the oscillation mode of the LD 110 changes due to external reflection and the power of the pump lights 111 and 112 steeply fluctuates, the steep fluctuation of the pump light 112 is detected by the detector 160, and the drive current 171 is varied by the adjustor 170. Thus, the LD 110 is brought into the multimode-oscillation state.

In the multimode-oscillation state, the LD 110 becomes unsusceptible to external reflection due to a reduced coherence thereof, and the power of the pump lights 111 and 112 is stabilized within a short period. Upon completion of the fluctuation of the drive current 171, the LD 110 reverts to a normal oscillation state. Thus, the changed oscillation state of the LD 110 can be reverted within a short period by immediately varying the drive current 171.

The phenomenon in which the power of the light output from the LD 110 becomes stable in the multimode-oscillation state is described in, for example, Numai Takahiro "Basics of Semiconductor Laser Technology," 30 Jul. 1996, pp. 118 to 131 and 152 to 163.

FIG. 2 is a diagram of a configuration example of the optical amplifying device depicted in FIG. 1. In FIG. 2, components similar to those depicted in FIG. 1 are assigned the same reference numerals, and description thereof is omitted. The optical amplifying device 100 depicted in FIG. 2 includes a branch 140, an optical-electric (OE) converter 210, and a comparator 220 in addition to the components described in FIG. 1. The optical amplifying device 100 further includes a driver 230 as the supplier 150 depicted in FIG. 1, an OE converter 240 and a high pass filter 250 as the detector 160, and a calculator 260 as the adjustor 170.

The branch 140, the OE converter 210, and the comparator 220 form a control unit that controls the drive current 171, based on the power of the output light 131 from the amplifying medium 130. The branch 140 branches a part of the output light 131 from the amplifying medium 130, and outputs the branched light to the OE converter 210 as a monitoring light 141. The OE converter 210 converts the monitoring light 141 from the branch 140 to an electrical signal, and outputs the converted electrical signal (voltage signal) to the comparator 220.

The electrical signal output from the OE converter 210 and a reference voltage indicating a target power of the monitoring light 141 are input to the comparator 220. The reference voltage is set according to a target power of the output light 131. The comparator 220 outputs a difference signal indicating the difference between the electrical signal and the reference voltage to the driver 230 as a drive signal 221.

The driver 230 outputs to the calculator 260, the drive current 151 according to the drive signal 221 (voltage signal) output from the comparator 220. For example, the driver 230 changes the drive current 151 such that the drive signal 221 output from the comparator 220 decreases, thereby achieving an automatic power control (APC) for controlling the power of the output light 131 to be constant.

The OE converter 240 converts the pump light 112 output from the LD 110 to an electrical signal, and outputs the converted electrical signal to the high pass filter 250 that extracts, from the electrical signal output from the OE converter 240, components having a frequency higher than the response speed of the amplifying medium 130. Thus, a fluctuation component in the power of the pump light 112 faster than the response speed of the amplifying medium 130 can be detected. The high pass filter 250 outputs the detected fluctuation component to the calculator 260 as the fluctuation signal 161.

The calculator 260 performs calculation on the drive current 151 output from the driver 230 and the fluctuation signal 161 output from the high pass filter 250. The calculation may be any calculation that causes the drive current 151 to vary according to the fluctuation signal 161, such as addition, subtraction, and multiplication. The calculator 260 provides the result of the calculation to the LD 110 as the drive current 171.

Each electrical component of the optical amplifying device 100 may be implemented by an analog circuit, a digital circuit, or a combination of analog and digital circuits. For example, the fluctuation component in the power of the pump light 112 may be calculated by converting the electrical signal output from the OE converter 240 to a digital signal and differentiating the converted digital signal.

Thus, the fluctuation component in the power of the pump light 112 faster than the response speed of the amplifying medium 130 is detected by the high pass filter 250, and the drive current 171 is varied based on the detected fluctuation component. Thus, the drive current 171 can be varied faster than the response speed of the amplifying medium 130 with a simple configuration.

FIG. 3A illustrates an example of operation of each component if the drive current 171 is not varied even when a fast fluctuation of the pump light 112 is detected by the detector 160. FIG. 3A illustrates an example of a change according to time in the power of the pump lights 111 and 112 output from the LD 110, the power of the output light 131 from the amplifying medium 130, and the drive current 171 output from the adjustor 170.

The power of the pump lights 111 and 112 is constant during the period up to time A, and the power of the output light 131 is also constant during the period. Thus, the drive current 171 is also constant during the period by the APC controlling the drive currents 151 and 171 such that the power of the output light 131 becomes constant.

If the pump lights 111 and 112 steeply increase at time A due to external reflection in the LD 110, the power of the output light 131 increases within the upper limit that is the response speed of the amplifying medium 130. Thus, the power of the output light 131 increases more gently than the pump lights 111 and 112. Accordingly, the drive current 171 gently decreases so as to suppress the increase of the output light 131, by the APC controlling the drive currents 151 and 171 such that the power of the output light 131 becomes constant.

If the condition of oscillation of the LD 110 changes due to the increased drive current 151 after time A and the LD 110 reverts to the original oscillation state at time B, a difference is caused between the power of the output light 131 and the target power even after time B since the output light 131 and the drive current 171 have changed so as to suppress the fluctuation of the pump lights 111 and 112 from time A.

Then the drive current 151 changes so as to decrease the difference between the power of the output light 131 and the target power, thereby reverting to the normal operation. Thus, the output light 131 disadvantageously fluctuates due to the fluctuation of the pump lights 111 and 112 if the drive current 151 is not varied.

Figure 3B:
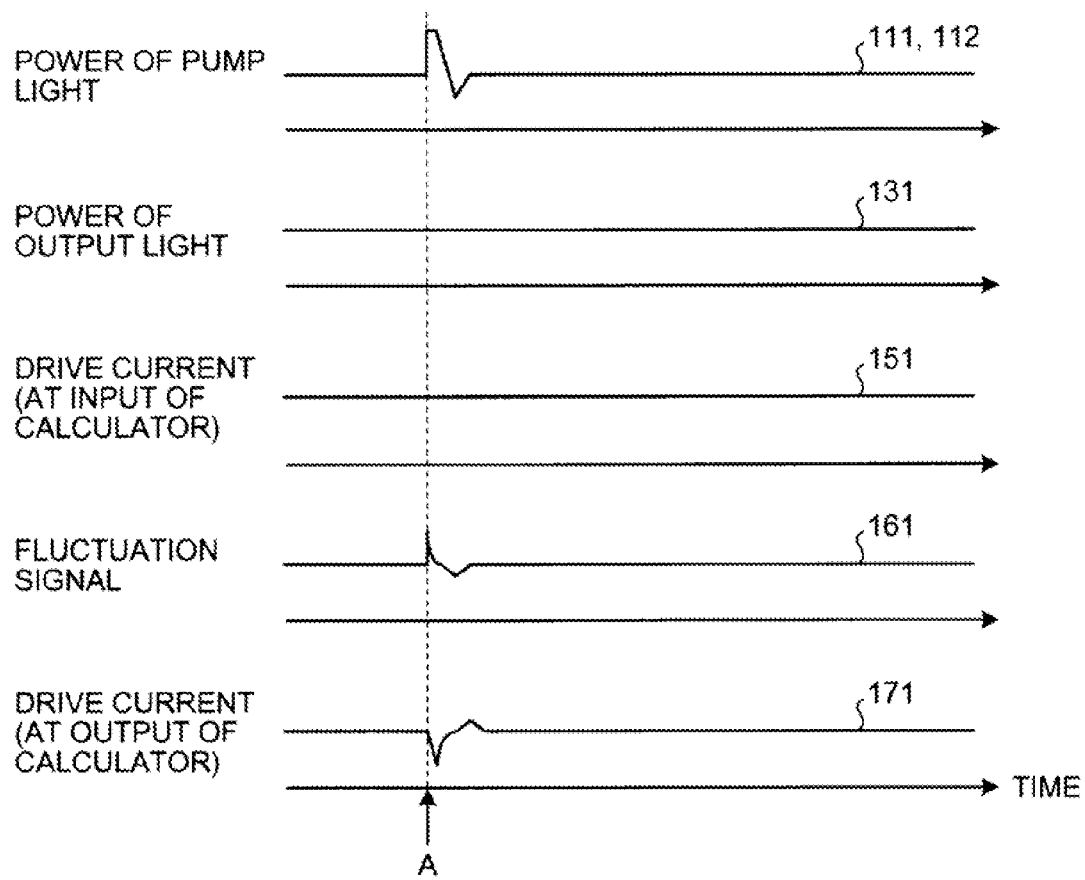

FIG. 3B illustrates an example of operation of each component when the drive current 171 provided to the LD 110 is varied by subtracting the fluctuation signal 161 from the drive current 151. FIG. 3B illustrates an example of a change according to time in the power of the pump lights 111 and 112, the power of the output light 131, the drive current 151, the fluctuation signal 161 output from the detector 160, and the drive current 171 output from the adjustor 170.

Similar to FIG. 3A, the power of the pump lights 111 and 112 is constant during the period up to time A, and the power of the output light 131 and the drive current 151 are also constant during the period. The fluctuation signal 161 is also constant (for example, 0) since the pump lights 111 and 112 are not fluctuated.

If the power of the pump lights 111 and 112 steeply increases due to external reflection at time A, the fluctuation signal 161 steeply increases and the drive current 171 obtained by subtracting the fluctuation signal 161 from the drive current 151 steeply decreases. Thus, the LD 110 is brought into the multimode-oscillation state, and the power of the pump lights 111 and 112 reverts to the original power and becomes stable within a short period from time A. Thus, a fluctuation in the power of the output light 131 caused by a fluctuation in the power of the pump lights 111 and 112 due to external reflection can be suppressed.

Although the power of the pump lights 111 and 112 decreases temporally due to the steep decrease of the drive current 171, the power of the output light 131 does not follow the decrease of the power of the pump lights 111 and 112 since the drive current 171 decreases more steeply than the response speed of the amplifying medium 130. Thus, a fluctuation in the power of the output light 131 due to a fluctuation of the drive current 171 can be suppressed.

FIG. 3C illustrates an example of operation of each component when the drive current 171 provided to the LD 110 is varied by adding the fluctuation signal 161 to the drive current 151. In FIG. 3C, components similar to those depicted in FIG. 3B are assigned the same reference numerals, and description thereof is omitted.

Similar to FIG. 3B, if the power of the pump lights 111 and 112 steeply increases due to external reflection at time A, the fluctuation signal 161 steeply increases and the drive current 171 obtained by adding the fluctuation signal 161 to the drive current 151 steeply increases. Thus, the LD 110 is brought into the multimode-oscillation state, and the power of the pump light 111 reverts to the original power and becomes stable within a short period from time A. Thus, a fluctuation in the power of the output light 131 caused by a fluctuation in the power of the pump lights 111 and 112 due to external reflection can be suppressed.

Although the power of the pump light 111 further increases temporally due to the increase of the drive current 171, the output light 131 does not follow the increase of the power of the pump light 111 since the drive current 171 increases more steeply than the response speed of the amplifying medium 130. Thus, a fluctuation in the power of the output light 131 due to a fluctuation of the drive current 171 can be suppressed.

Figure 4A:
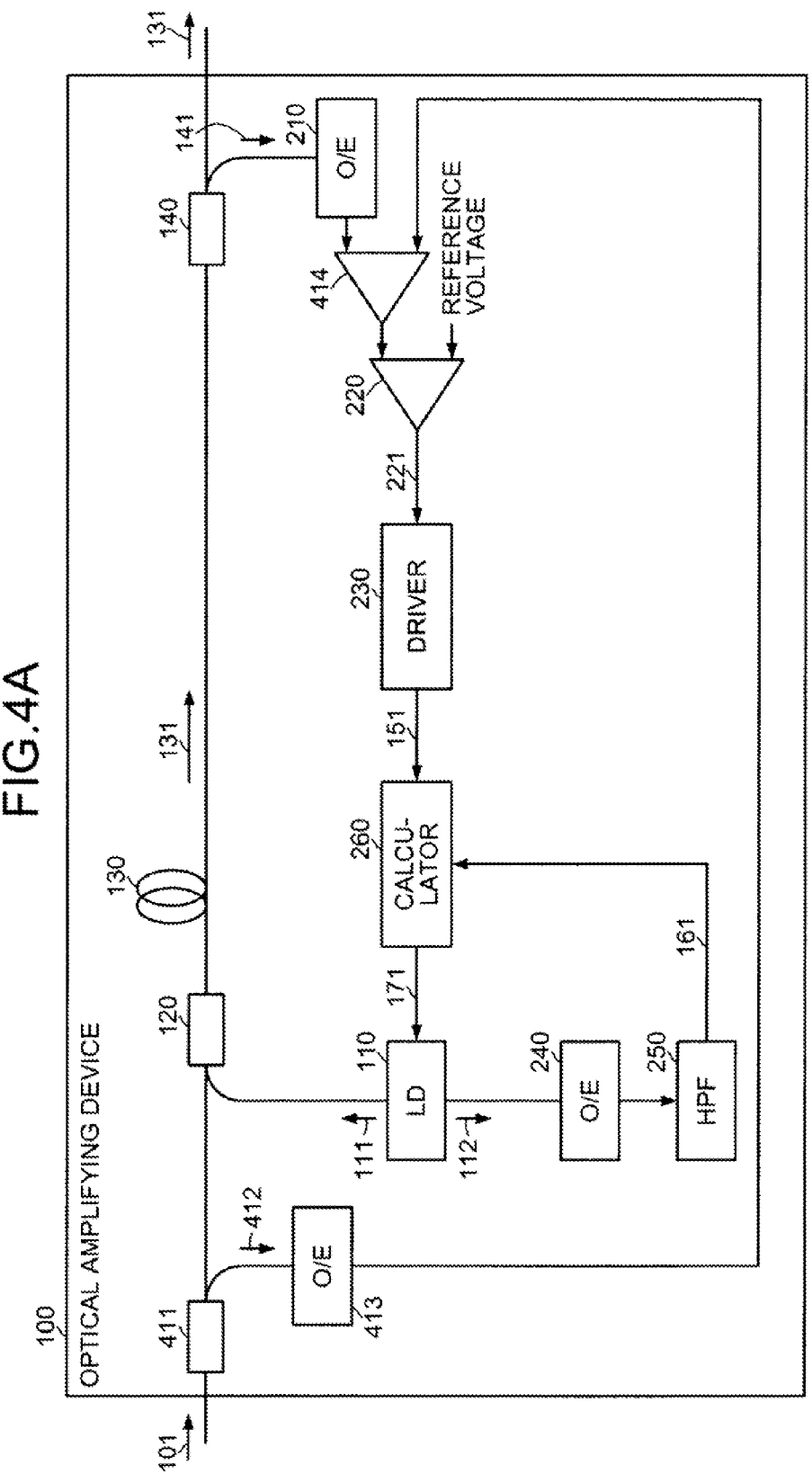

FIG. 4A is a diagram of a first modification of the optical amplifying device depicted in FIG. 2. In FIG. 4A, components similar to those depicted in FIG. 2 are assigned the same reference numerals, and description thereof is omitted. As depicted in FIG. 4A, the optical amplifying device 100 may include a branch 411, an OE converter 413, and a comparator 414 in addition to the components depicted in FIG. 2.

The branch 411 branches a part of the input light 101 input to the combiner 120, and outputs the branched light to the OE converter 413 as a monitoring light 412. The OE converter 413 converts the monitoring light 412 output from the branch 411 into an electrical signal, and outputs the converted electrical signal to the comparator 414.

Electrical signals output from the OE converters 210 and 413 are input to the comparator 414 that outputs a difference signal indicating the difference between the electrical signals to the comparator 220. Thus, the difference signal output from the comparator 414 indicates the gain of the output light 131 with respect to the input light 101.

The difference signal output from the comparator 414 and a reference voltage indicating a target gain of the monitoring light 141 are input to the comparator 220. The reference voltage is set according to a target gain of the output light 131. The comparator 220 outputs a difference signal indicating the difference between the input difference signal and the reference voltage to the driver 230 as the drive signal 221.

The driver 230 outputs the drive current 151 according to the drive signal 221 (voltage signal) output from the comparator 220 to the calculator 260. For example, the driver 230 changes the drive current 151 such that the drive signal 221 output from the comparator 220 decreases, thereby achieving an automatic gain control (AGC) for controlling the gain of the output light 131 to be constant.

FIG. 4B is a diagram of a second modification of the optical amplifying device depicted in FIG. 2. In FIG. 4B, components similar to those depicted in FIG. 2 are assigned the same reference numerals, and description thereof is omitted. As depicted in FIG. 4B, a constant reference voltage may be input to the driver 230 as the drive signal 221. In this case, the branch 140, the OE converter 210, and the comparator 220 depicted in FIG. 2 may be omitted. The driver 230 outputs a constant drive current 151 according to the reference voltage to the calculator 260.

FIG. 4C is a diagram of a third modification of the optical amplifying device depicted in FIG. 2. In FIG. 4C, components similar to those depicted in FIG. 2 are assigned the same reference numerals, and description thereof is omitted. As depicted in FIG. 4C, the optical amplifying device 100 may include a band pass filter (BPF) 431 in place of the high pass filter 250 depicted in FIG. 2. The BPF 431 extracts a fluctuation component of a given frequency band from the electrical signal output from the OE converter 240.

That is, the BPF 431 removes, from the electrical signal output from the OE converter 240, components having a frequency higher than the response speed of the amplifying medium 130 or lower than a given frequency, and outputs the extracted fluctuation component to the calculator 260 as the fluctuation signal 161. Thus, unnecessary operation due to high-frequency noise can be suppressed by removing the electrical signal output from the OE converter 240.

FIG. 4D is a diagram of a fourth modification of the optical amplifying device depicted in FIG. 2. In FIG. 4D, components similar to those depicted in FIG. 2 are assigned the same reference numerals, and description thereof is omitted. As depicted in FIG. 4D, the drive current 171 provided to the LD 110 may be indirectly varied by providing the calculator 260 between the comparator 220 and the driver 230 and varying the drive signal 221 input to the driver 230 by the calculator 260.

Although not depicted, the drive current 171 may be indirectly varied by providing the calculator 260 between the OE converter 210 and the comparator 220 and varying the electrical signal input to the comparator 220 by the calculator 260, or by providing the calculator 260 at the input of the comparator 220 and varying the reference voltage input to the comparator 220 by the calculator 260.

FIG. 4E is a diagram of a fifth modification of the optical amplifying device depicted in FIG. 2. In FIG. 4E, components similar to those depicted in FIG. 2 are assigned the same reference numerals, and description thereof is omitted. As depicted in FIG. 4E, the optical amplifying device 100 may include an OE converter 240, a high pass filter 250, and a comparator 451 as the detector 160 depicted in FIG. 1.

The comparator 451 compares the fluctuation component output from the high pass filter 250 to a threshold, and outputs a signal indicating whether the fluctuation component exceeds the threshold to the calculator 260 as the fluctuation signal 161. Thus, the fluctuation signal 161 output from the comparator 451 indicates whether the power of the pump lights 111 and 112 is fluctuated faster than the response speed of the amplifying medium 130.

For example, the comparator 451 outputs "0" as the fluctuation signal 161 if the fluctuation component does not exceed the threshold, and otherwise outputs "1". The calculator 260 performs calculation (such as addition and subtraction) on the drive current 151 and the fluctuation signal 161. Thus, the drive current 171 can be varied if the fluctuation component exceeds the threshold, and otherwise not varied.

FIG. 5A is a diagram of a sixth modification of the optical amplifying device depicted in FIG. 2. In FIG. 5A, components similar to those depicted in FIG. 2 are assigned the same reference numerals, and description thereof is omitted. As depicted in FIG. 5A, the optical amplifying device 100 may include a limiter 511 in addition to the components depicted in FIG. 2. The limiter 511 suppresses the power of the fluctuation signal 161 output from the high pass filter 250 to the calculator 260 within a given level. Thus, the calculator 260 can vary the drive current 171 within a given amount, thereby preventing the LD 110 from being damaged due to an excess drive current 171 provided to the LD 110.

FIG. 5B is a diagram of a seventh modification of the optical amplifying device depicted in FIG. 2. In FIG. 5B, components similar to those depicted in FIG. 2 are assigned the same reference numerals, and description thereof is omitted. As depicted in FIG. 5B, the optical amplifying device 100 may include a low-level-component suppressor 521 in addition to the components depicted in FIG. 2. The low-level-component suppressor 521 suppresses components of the fluctuation signal 161 output from the high pass filter 250 to the calculator 260 having a level lower than a given level.

Thus, a fluctuation of the drive current 171 can be prevented if the amount of a fluctuation of the pump light 112 does not exceed a given amount. For example, a fluctuation in the drive current 171 due to a small fluctuation of the pump light 111 caused by noise or causing no problem in the fluctuation in the power of the output light 131 can be prevented.

The low-level-component suppressor 521 may decrease components of the fluctuation signal 161 output from the high pass filter 250 to the calculator 260 having a level lower than a given level. Thus, the amount of variation of the drive current 171 can be decreased if the amount of fluctuation of the pump light 112 does not exceed a given amount. For example, a fluctuation in the drive current 171 due to a small fluctuation of the pump light 111 caused by noise or causing no problem in the fluctuation in the power of the output light 131 can be suppressed.

Thus, the amount of variation of the drive current 171 can be decreased (including a case where the amount is made to 0) if the amount of fluctuation in the pump light 112 does not exceed a given amount. Thus, a fluctuation in the drive current 171 due to a small fluctuation of the pump light 111 caused by noise or causing no problem in the fluctuation in the power of the output light 131 can be suppressed, thereby stabilizing operation.

FIG. 5C is a diagram of an eighth modification of the optical amplifying device depicted in FIG. 2. In FIG. 5C, components similar to those depicted in FIG. 2 are assigned the same reference numerals, and description thereof is omitted. As depicted in FIG. 5C, the optical amplifying device 100 may include a correcting unit 531 in addition to the components depicted in FIG. 2. The correcting unit 531 corrects the fluctuation signal 161 output from the high pass filter 250 to the calculator 260 by the drive signal 221 output from the comparator 220.

Since the level of the drive current 151 is determined by the drive signal 221, the amount of variation of the drive current 171 can be corrected according to the level of the drive current 151 by correcting the fluctuation signal 161 by the drive signal 221. Thus, the amount of variation of the drive current 171 can be corrected according to the driving power of the LD 110.

For example, if the operation of the LD 110 becomes unstable when the output from the LD 110 is low, the correcting unit 531 increases the fluctuation signal 161 as the drive signal 221 decreases. Thus, the amount of variation of the drive current 171 can be increased as the driving power of the LD 110 decreases, thereby increasing the gain of the LD 110 when the driving power of the LD 110 is low and stabilizing the operation of the LD 110.

Although not depicted, the correcting unit 531 may correct the fluctuation signal 161 by the electrical signal output from the OE converter 210, or by the reference voltage input to the comparator 220. Since the drive signal 221 is determined by the electrical signal output from the OE converter 210 or the reference voltage input to the comparator 220, the amount of variation of the drive current 171 can be corrected according to the level of the drive current 151 by correcting the fluctuation signal 161 by the electrical signal output from the OE converter 210 or the reference voltage.

FIG. 5D is a diagram of a ninth modification of the optical amplifying device depicted in FIG. 2. In FIG. 5D, components similar to those depicted in FIG. 5C are assigned the same reference numerals, and description thereof is omitted. As depicted in FIG. 5D, the optical amplifying device 100 may include an equalizer 541 in addition to the components depicted in FIG. 5C.

The equalizer 541 equalizes the electrical signal output from the OE converter 240, and outputs the electrical signal to the correcting unit 531. Thus, high-frequency components of the electrical signal output from the OE converter 240 can be removed. The equalizer 541 can be implemented by, for example, a low pass filter (LPF).

The correcting unit 531 may correct the fluctuation signal 161 output from the high pass filter 250 to the calculator 260 by the electrical signal output from the equalizer 541. Since the electrical signal output from the OE converter 240 is determined by the level of the drive current 151, the amount of variation of the drive current 171 can be corrected according to the level of the drive current 151 by correcting the fluctuation signal 161 by the electrical signal output from the OE converter 240.

Further, a change in the level of the drive current 151 due to a steep fluctuation in the drive current 171 by the calculator 260 can be ignored by removing the high-frequency components of the electrical signal output from the OE converter 240 by the equalizer 541. As depicted in FIGS. 5C and 5D, a fluctuation of the output light 131 can be suppressed more according to the characteristics of the LD 110 and the amplifying medium 130 by varying the drive current 171 by an amount of variation according to the level of the varying drive current 151.

The optical amplifying device 100 may have a configuration in which modifications depicted in FIGS. 4A to 4E and 5A to 5D are combined. For example, the optical amplifying device 100 may include any two or more of the limiter 511, the low-level-component suppressor 521, the correcting unit 531, and the equalizer 541.

As described above, the optical amplifying device 100 according to the first embodiment varies the drive current 171 of the LD 110 if a fluctuation faster than the response speed of the amplifying medium 130 is detected in the power of the pump light 111 input from the LD 110 to the amplifying medium 130. Thus, the power of the pump light 111 can be stabilized within a short period by the multimode oscillation of the LD 110, thereby stabilizing the power of the output light 131 from the amplifying medium 130.

The power of the output light 131 during normal operation can be also stabilized since no operation for suppression of the fluctuation of the output light 131 (for example, the fluctuation of the drive current 171) is needed if no transitional fluctuation in the power of the pump light 111 is detected. Even when a transitional fluctuation in the power of the pump light 111 is detected, the cycle of the fluctuation is highly dependent on the external environment and thus indefinite. Thus, compared to the conventional technology that superimposes a high frequency (for example, see Japanese Laid-Open Patent Publication Nos. H8-32162 and H8-204267 described above), the high-frequency component of the output light 131 is not likely to accumulate even when multiple LDs 110 or optical amplifiers are connected, thereby improving the transmission quality.

If the drive current 151 is controlled based on the power of the output light 131, the controlled drive current 151 may be varied. Thus, compared to the redundant feedback control in which the drive current 151 is separately controlled to make the power of the pump light 112 to be constant, the control of the drive current 151 can be simplified and the power of the pump light 111 can be stabilized.

FIG. 6A is a diagram of a configuration example of an optical amplifying device according to a second embodiment. In FIG. 6A, components similar to those depicted in FIG. 2 are assigned the same reference numerals, and description thereof is omitted. As depicted in FIG. 6A, the optical amplifying device 100 according to the second embodiment includes a subtractor 710 in addition to the components depicted in FIG. 2.

The subtractor 710 subtracts the drive current 171 output from the calculator 260 to the LD 110 from the electrical signal output from the OE converter 240 to the high pass filter 250. Thus, the power of the pump light 112 can be subtracted according to the amount of variation of the drive current 171 by the calculator 260. The high pass filter 250 extracts high-frequency components from the electrical signal subtracted by the subtractor 710.

Thus, a fluctuation faster than the response speed of the amplifying medium 130 can be detected in the power of the pump light 112 subtracted according to the amount of variation of the drive current 171 by the calculator 260, thereby preventing a detection of a fluctuation in the power of the pump light 112 due to a fluctuation of the drive current 171.

Thus, the drive current 171 can be prevented from being varied by the calculator 260 by intentionally changing the drive current 151 so as to follow a steep fluctuation in the power of the input light 101, thereby preventing an intentional change in the drive current 151 from being disadvantageously suppressed.

Figure 6B:
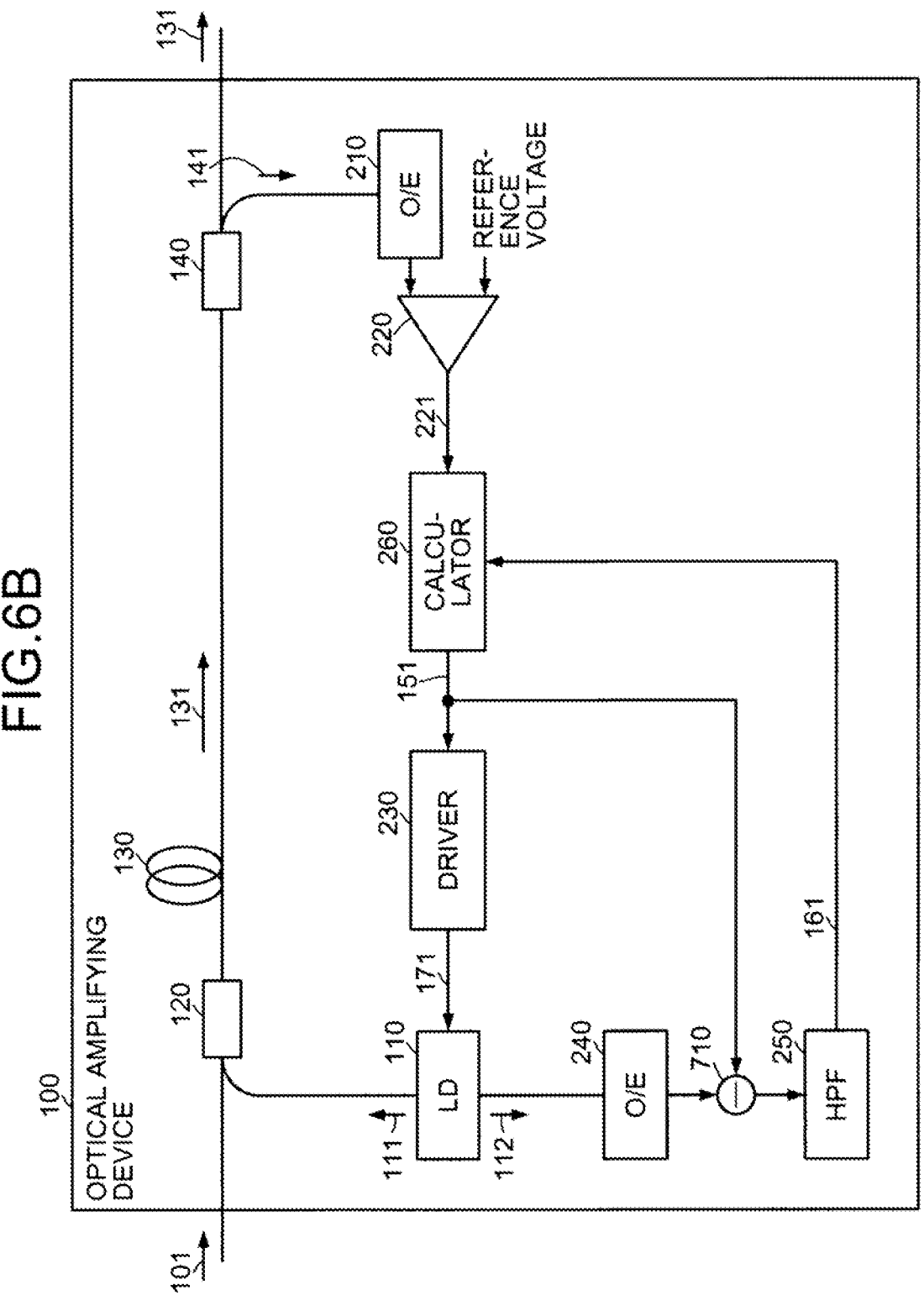
FIG. 6B is a diagram of a modification of the optical amplifying device depicted in FIG. 6A.

FIG. 6B is a diagram of a modification of the optical amplifying device depicted in FIG. 6A. In FIG. 6B, components similar to those depicted in FIG. 4D or 6A are assigned the same reference numerals, and description thereof is omitted. As depicted in FIG. 6B, the calculator 260 is provided between the comparator 220 and the driver 230.

The subtractor 710 may subtract the drive signal 221 output from the calculator 260 to the driver 230 from the electrical signal output from the OE converter 240 to the high pass filter 250. Also in this case, the power of the pump light 112 can be subtracted according to the amount of variation of the drive current 171 by the calculator 260, thereby preventing a detection of a fluctuation in the power of the pump light 112 due to a fluctuation of the drive current 171, and preventing an intentional change in the drive current 151 from being disadvantageously suppressed.

As described above, the optical amplifying device 100 according to the second embodiment can detect, in the difference between the power of the pump light 112 and the drive current 171 varied by the calculator 260, a fluctuation faster than the response speed of the amplifying medium 130, thereby preventing a detection of a fluctuation in the power of the pump light 112 due to a fluctuation of the drive current 171. Thus, the drive current 171 can be prevented from being varied by the calculator 260 by intentionally changing the drive current 151, thereby preventing an intentional change in the drive current 151 from being disadvantageously suppressed.

FIG. 7A is a diagram of a configuration example of an optical amplifying device according to a third embodiment. In FIG. 7A, components similar to those depicted in FIG. 2 are assigned the same reference numerals, and description thereof is omitted. As depicted in FIG. 7A, the optical amplifying device 100 includes a fluctuation-component detector 711 (fluctuation detector) and a multiplier 712 in addition to the components depicted in FIG. 2.

The fluctuation-component detector 711 detects fluctuation components of the drive current 151 having a frequency higher than a given frequency corresponding to, for example, a speed for intentionally changing the drive signal 221 (the driving power of the LD 110). The fluctuation-component detector 711 outputs a fluctuation signal indicating the result of the detection to the multiplier 712.

The multiplier 712 corrects the fluctuation signal 161 output from the high pass filter 250 to the calculator 260 by the fluctuation signal output from the fluctuation-component detector 711 (for example, by multiplying the fluctuation signal 161 by the fluctuation component). When a fluctuation of the drive current 151 having a frequency higher than a given frequency is detected, the multiplier 712 decreases the fluctuation signal 161 more than when such fluctuation is not detected. Thus, when the fluctuation is detected, the amount of variation of the drive current 171 can be decreased more than when such fluctuation is not detected.

Figure 7B:
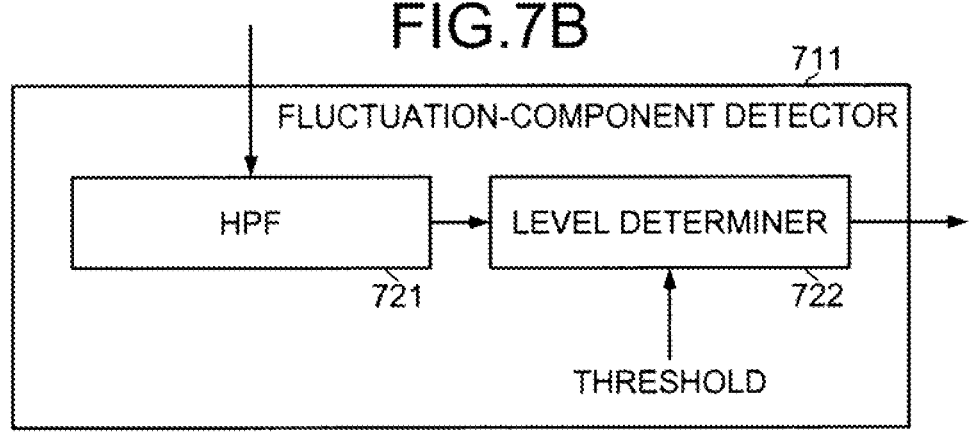
FIG. 7B is a diagram of a configuration example of a fluctuation-component detector depicted in FIG. 7A.

FIG. 7B is a diagram of a configuration example of the fluctuation-component detector depicted in FIG. 7A. As depicted in FIG. 7B, the fluctuation component detector 711 includes a high pass filter (HPF) 721 and a level determiner 722. The HPF 721 extracts, from among a signal input to the fluctuation-component detector 711, a component having a frequency higher than the speed of the drive signal 221 (i.e., the speed for intentionally changing the driving power of the LD 110) as a fluctuation component, and outputs the extracted fluctuation component to the level determiner 722.

The level determiner 722 compares the fluctuation component output from the HPF 721 and a given threshold, and if the fluctuation component exceeds the threshold, outputs to the multiplier 712, a signal for decreasing the fluctuation signal 161 (for example, a value smaller than 1). The signal for decreasing the fluctuation signal 161 may make the fluctuation signal 161 to be 0. Alternatively, the level determiner 722 may keep masking the fluctuation signal 161 for a given period when the fluctuation component exceeds the threshold. Thus, fluctuation of the drive current 171 can be suppressed when the driving power of the LD 110 is intentionally changed.

FIG. 7C is diagram of a modification of the optical amplifying device depicted in FIG. 7A. In FIG. 7C, components similar to those depicted in FIG. 4D or 7A are assigned the same reference numerals, and description thereof is omitted. As depicted in FIG. 7C, the calculator 260 is provided between the comparator 220 and the driver 230. The fluctuation-component detector 711 may extract a fluctuation component having a given frequency from the drive signal 221 output from the comparator 220 to the calculator 260.

As described above, the optical amplifying device 100 according to the third embodiment detects a fluctuation of the drive current 151 having a given frequency, and decreases the amount of variation of the drive current 171 more than when such fluctuation is not detected. Thus, the fluctuation of the drive current 171 by the calculator 260 can be suppressed when the drive current 151 is intentionally changed, thereby preventing an intentional change in the drive current 151 from being disadvantageously suppressed.

As described above, the optical amplifying device and the optical amplifying method can stabilize the power of the output light.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical amplifying device comprising:
 a semiconductor laser that outputs a pump light having a power according to a provided drive current;
 a rare-earth-doped amplifying medium that amplifies an input light by the pump light output from the semiconductor laser; and
 a detector that detects, in the power of the pump light, only a fluctuation faster than a response speed of a gain of the amplifying medium with respect to the power of the pump light, wherein
 the optical amplifying device varies the drive current provided to the semiconductor laser based on the fluctuation detected by the detector.

2. The optical amplifying device according to claim 1, wherein the optical amplifying device varies the drive current based on the fluctuation detected by the detector such that the semiconductor laser oscillates in multiple modes.

3. The optical amplifying device according to claim 1, wherein the optical amplifying device varies the drive current faster than the response speed based on the fluctuation detected by the detector.

4. The optical amplifying device according to claim 1, further comprising an adjustor that varies the drive current provided to the semiconductor laser based on the fluctuation detected by the detector.

5. The optical amplifying device according to claim 1, further comprising a control unit that controls the drive current based on a power of a light amplified by the amplifying medium.

6. The optical amplifying device according to claim 1, further comprising a supplier that provides a given drive current to the semiconductor laser, wherein
 the optical amplifying device varies the drive current provided to the semiconductor laser by the supplier.

7. The optical amplifying device according to claim 1, wherein the optical amplifying device varies the drive current within a given amount.

8. The optical amplifying device according to claim 1, wherein the optical amplifying device decreases, when an amount of variation of the pump light does not exceed a given amount, an amount of variation of the drive current more than when the amount of variation exceeds the given amount.

9. The optical amplifying device according to claim 1, wherein the optical amplifying device varies the drive current by an amount of variation according to a level of the varying drive current.

10. The optical amplifying device according to claim 1, wherein the detector detects a fluctuation faster than the response speed in a difference between the power of the pump light and the varied drive current.

11. The optical amplifying device according to claim 1, further comprising a fluctuation detector that detects, in the drive current provided to the semiconductor laser, a fluctuation having a frequency higher than a given frequency, wherein
 the optical amplifying device decreases, when the fluctuation having the frequency higher than the given frequency is detected, an amount of variation of the drive current more than when the fluctuation is not detected.

12. An optical amplifying method using a semiconductor laser that outputs a pump light having a power according to a provided drive current and a rare-earth-doped amplifying medium that amplifies an input light by the pump light output from the semiconductor laser, the optical amplifying method comprising:
 detecting, in the power of the pump light, only a fluctuation faster than a response speed of a gain of the amplifying medium with respect to the power of the pump light; and
 varying the drive current provided to the semiconductor laser when the fluctuation is detected.

* * * * *